(12) United States Patent
Akahane et al.

(10) Patent No.: US 6,456,029 B1
(45) Date of Patent: Sep. 24, 2002

(54) CONTROLLER FOR VEHICLE MOTOR

(75) Inventors: Fumihiro Akahane, Kanagawa; Shinichi Kobayashi, Aichi, both of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/709,295

(22) Filed: Nov. 13, 2000

(30) Foreign Application Priority Data

Mar. 3, 2000 (JP) ........................................ 2000-058262

(51) Int. Cl.[7] ................................................. H05K 7/02
(52) U.S. Cl. ...................... 318/538; 318/722; 318/801; 318/139; 363/132
(58) Field of Search ................................. 318/139, 801, 318/802, 803, 538, 722; 363/123, 131, 132, 133, 134

(56) References Cited

U.S. PATENT DOCUMENTS

| | | | | | |
|---|---|---|---|---|---|
| 5,610,493 | A | * | 3/1997 | Wieloch | 318/801 |
| 5,623,399 | A | * | 4/1997 | Ishii et al. | 363/132 |
| 5,729,450 | A | * | 3/1998 | Dimino et al. | 363/132 |
| 5,844,386 | A | * | 12/1998 | Matsuoka et al. | 318/287 |
| 5,914,577 | A | * | 6/1999 | Furnival | 318/538 |

* cited by examiner

Primary Examiner—Bentsu Ro (57) ABSTRACT

A controller for a vehicle motor includes a switching unit, a capacitor unit, output terminals and wiring lines. The switching unit is provided on a substrate to control power supply to a motor. The capacitor unit is arranged in neighborhood of the switching unit, and is connected to the switching unit. The output terminals are connected to the motor. The wiring lines connect the switching unit and the output terminals in a straight line route.

10 Claims, 7 Drawing Sheets

CONTROLLER FOR VEHICLE MOTOR

BACKGROUND OF THE INVENTION

1. Field of the Invention

The present invention relates to a controller for controlling a motor provided for a vehicle.

2. Description of the Related Art

Electric vehicles such as an electric drive type forklift have a running mechanism section and a lifting mechanism section. The running mechanism section is mainly composed of a running motor, an accelerating mechanism section and a braking mechanism section, which are used for the running of the vehicle. The lifting mechanism section is mainly composed of a lifting motor, an operation lever, and a hydraulic pressure mechanism section, which are used for the lifting operation by the forklift.

The running motor and the working motor are controlled by a controller in which electric circuits are collectively arranged. The controller is composed of a running motor chopper used for the control of the running motor and a lifting motor chopper used for the control of the lifting motor. The chopper is a switching unit to carry out a switching operation. The switching unit is composed of an IGBT (Insulated Gate Bipolar Transistor) device and a diode unit.

Figure 1:
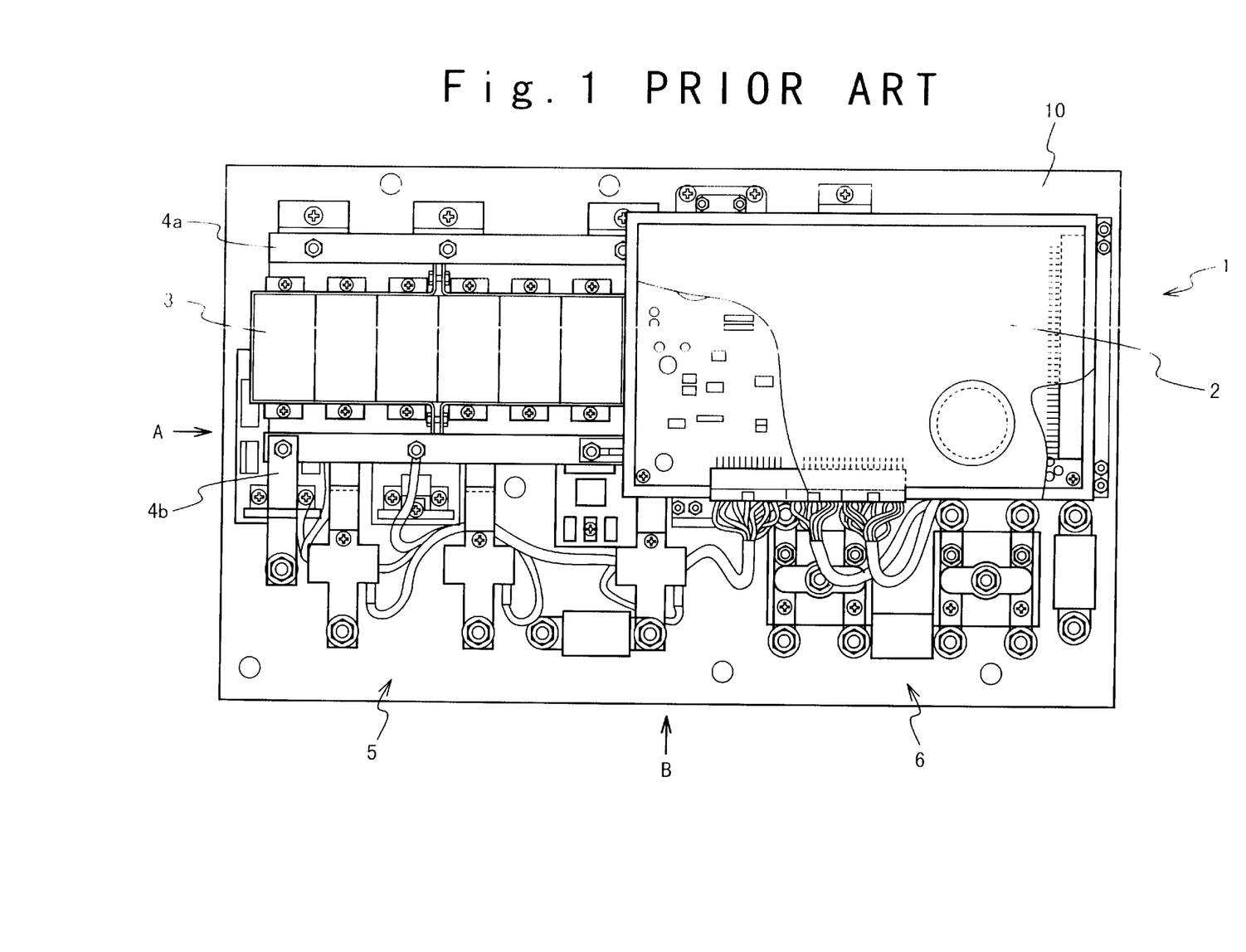
FIG. 1 is a plan view of a conventional controller for a motor of a vehicle.

FIG. 1 is a plan view of a conventional controller. Referring to FIG. 1, the controller 1 is composed of a control unit 2, a capacitor unit 3, a wiring line group 4 of a first bus bar or a first wiring line 4a and a second bus bar or a second wiring line 4b, a first terminal group 5 and a second terminal group 6.

In FIG. 1, the control unit 2 is arranged in an upper right section. The capacitor unit 3 is arranged in the left side of the control unit 2. The first bus bar 4a and the second bus bar 4b are arranged along the capacitor unit 3. The first terminal group 5 is arranged under the capacitor unit 3 in the figure. The second terminal group 6 is arranged on the right side of the first terminal group 5.

Figure 2:
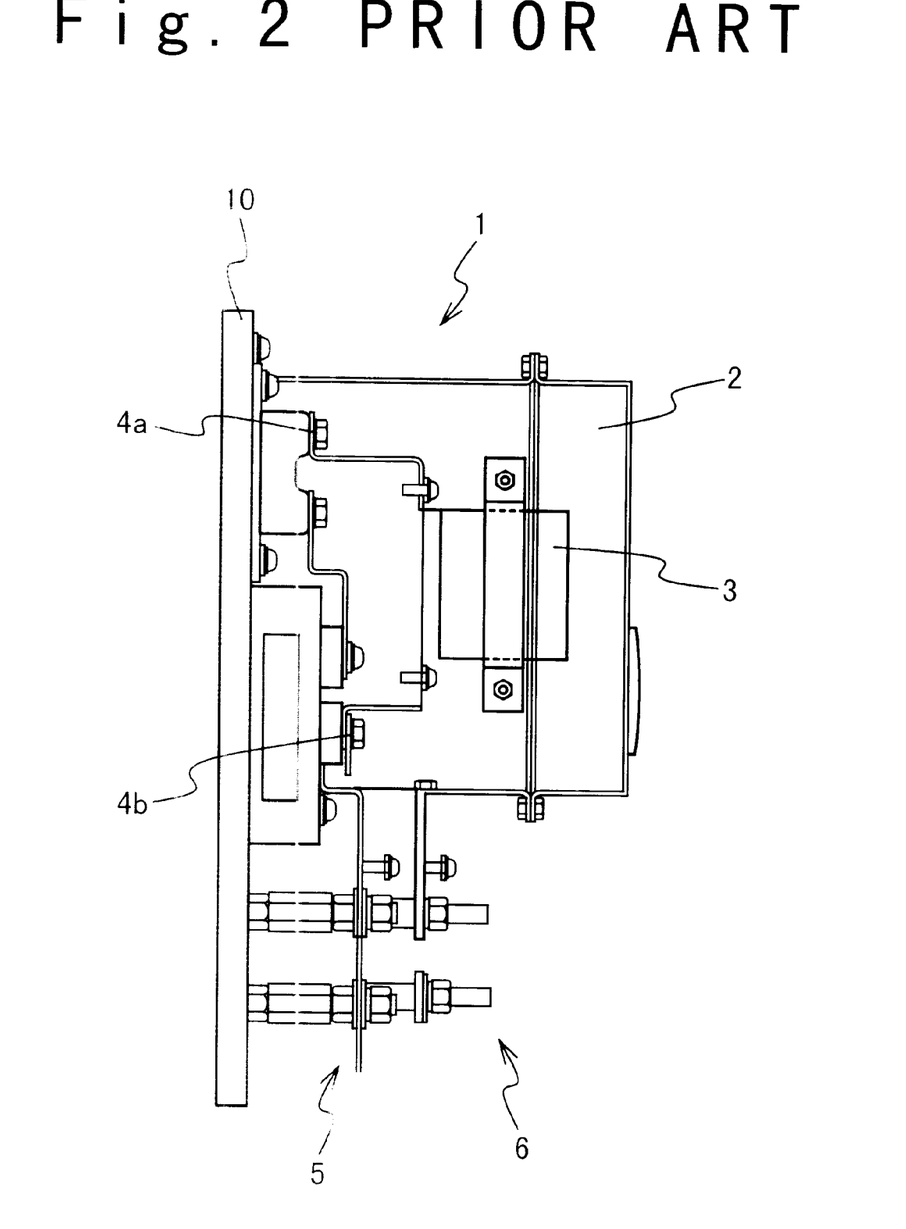
FIG. 2 is a side view of the conventional controller.

FIG. 2 shows a side view of the conventional controller, when the controller 1 is viewed from the direction of A of FIG. 1. The capacitor unit 3 is arranged along the first bus bar 4a and the second bus bar 4b on a substrate 10 as shown in FIG. 1. The control unit 2 is arranged on the substrate 10. Also, the first terminal group 5 and the second terminal group 6 are arranged on the substrate 10.

Figure 3:
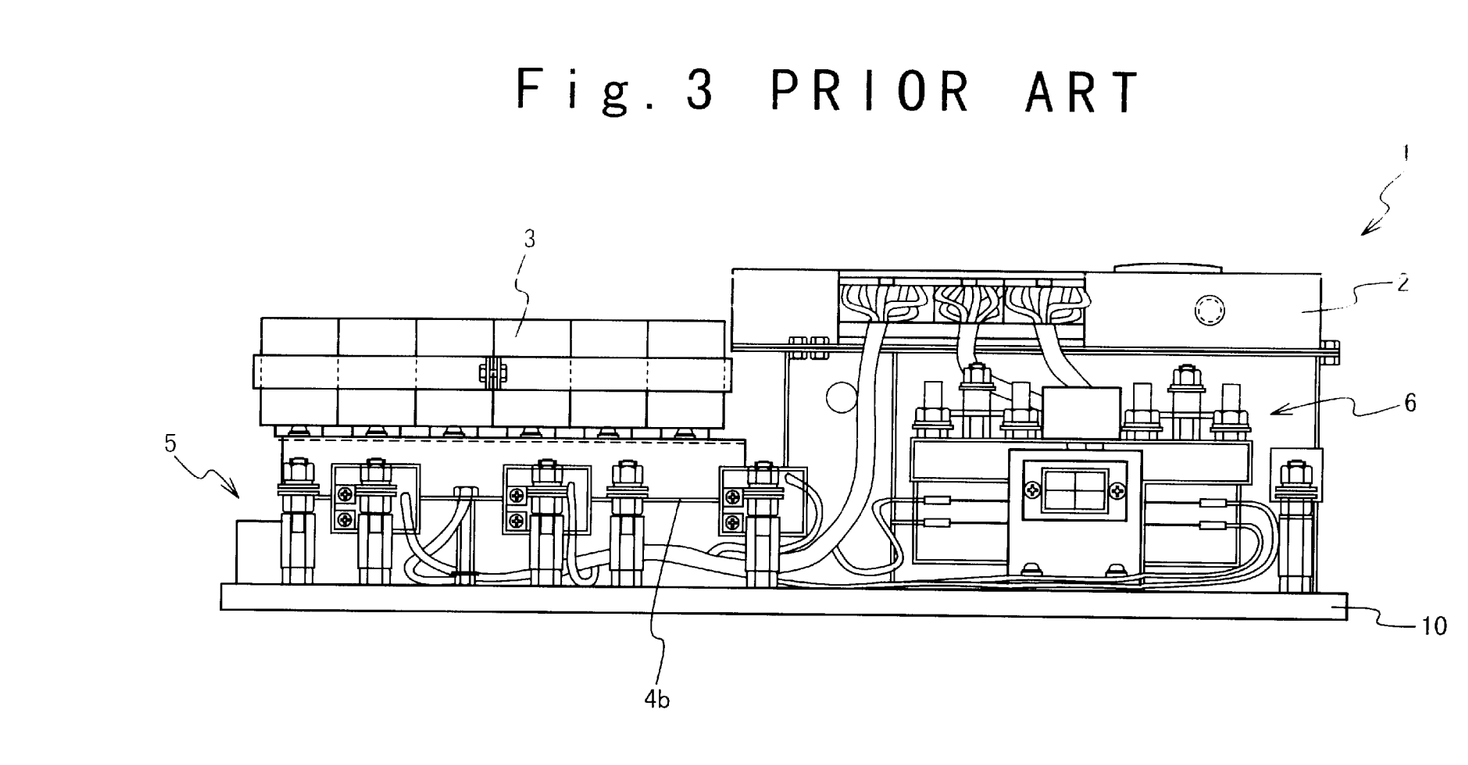
FIG. 3 is a front view of the conventional controller.

FIG. 3 shows a front view of the conventional controller, when the controller is viewed from the direction of B in FIG. 1. Referring to FIG. 3, the control unit 2 is provided onto the substrate 10. The capacitor unit 3 is provided above the substrate 10 through the first bus bar 4a and the second bus bar 4b. The first terminal group 5 and the second terminal group 6 are provided on the substrate 10.

The first terminal group 5 is composed of five terminals. The second terminal group 6 is composed of five terminals. The capacitor unit 3 is composed of six capacitors.

Figure 4:
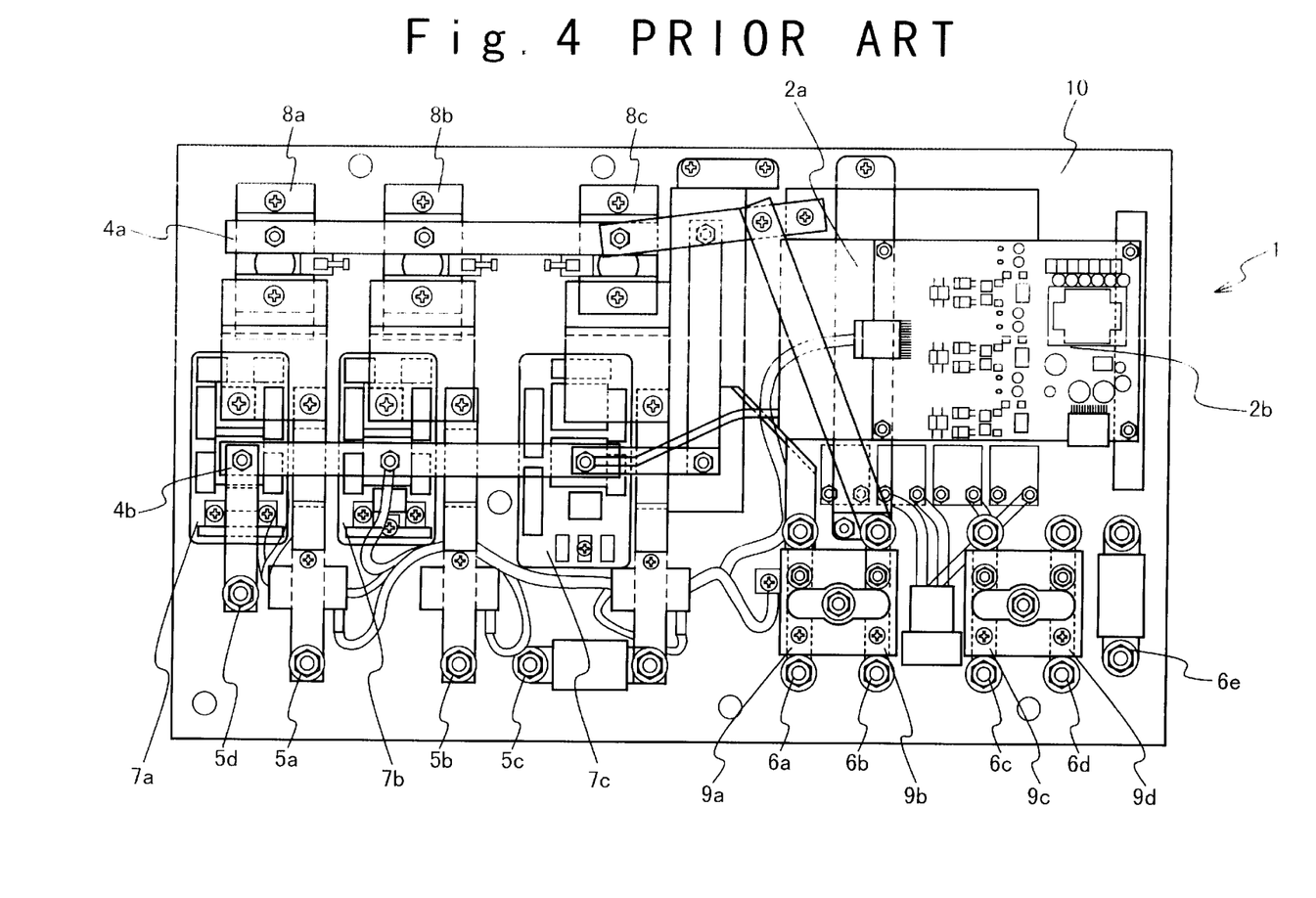
FIG. 4 is another plan view of the conventional controller.

FIG. 4 shows another plan view of conventional controller, when the controller 2 and the capacitor unit 3 are removed from the state shown in FIG. 1. Referring to FIG. 4, on the substrate 10 are arranged the first bus bar 4a, the second bus bar 4b, the first to fourth terminals 5a to 5d, the fifth to ninth terminals 6a to 6e, the first to third IGBT devices 7a to 7c, the first to third diodes 8a to 8c, and the first to fourth terminal receiving planes 9a to 9d.

The first to third IGBT devices 7a to 7c are provided on the substrate 10. Also, the first to third diodes 8a to 8c are provided on the substrate 10. The first bus bar 4a is connected to one end of each of the first to third diodes 8a to 8c. The first to third IGBT devices 7a to 7c are connected with the second bus bar 4b at one end. The second bus bar 4b is connected with the fourth terminal 5d. The fourth terminal 5d is connected with a negative terminal of a battery (not shown). The other terminal of the first diode 8a is connected with the other terminal of the first IGBT device 7a and the first terminal 5a. The other terminal of the second diode 8b is connected with the other terminal of the second IGBT device 7b and the second terminal 5b. The other terminal of the third diode 8c is connected with the other terminal of the third IGBT device 7c and the third terminal 5c. The first bus bar 4a is connected with the fourth to eighth terminals 6a to 6e. The seventh terminal 6d is connected with the positive terminal of the battery (not shown). The eighth terminal 6e is connected with a power steering motor (not shown).

The first, second and sixth terminals 5a, 5b and 6a are connected with the running motor. The third and fifth terminals 5c and 6c are connected with the working motor (not shown).

In the conventional controller 1, the switching unit, namely, the first to third IGBT devices 7a to 7c and the first to third diodes 8a to 8c share the capacitor unit 3 in common. Therefore, the arrangement position of the capacitors to the switching unit is not always appropriate. When the arrangement position of the capacitors is not appropriate, there is a case that the effect of inductance correction is not sufficiently obtained.

Also, the wiring line route of the bus bar is long and complicated. Therefore, the bus bar needs to be processed or fabricated in accordance with the wiring line route. The fabrication of the bus bar causes cost rise.

SUMMARY OF THE INVENTION

Therefore, an object of the present invention is to provide a controller for a motor of a vehicle, in which a capacitor unit can be arranged in an appropriate position to a switching unit.

Another object of the present invention is to provide a controller for a motor of a vehicle, in which it not necessary to prepare a bus bar with a complicated shape.

In order to achieve an aspect of the present invention, a controller for a vehicle motor, includes a switching unit, a capacitor unit, output terminals and wiring lines. The switching unit is provided on a substrate to control power supply to a motor. The capacitor unit is arranged adjacent the switching unit, and is connected to the switching unit. The output terminals are connected to the motor. The wiring lines in the form of elongated bus bars connect the switching unit and the output terminals in a straight line route.

In this case, the switching unit may include switching devices and diodes arranged in alignment with the switching devices, respectively. In this case, the wiring lines, i.e. bus bars, are provided so as to extend in a direction orthogonal to the alignment of the diode and the switching device.

Also, the capacitor unit is provided above the switching unit using brackets. It is desirable that the capacitor unit is provided above the switching unit using brackets. In this case, when the capacitor unit is connected to the switching devices and the diodes, a direction of the brackets is substantially parallel to wiring lines between the switching devices and the diodes.

Also, the controller for the vehicle motor may further include a control circuit formed on an additional substrate which extends upward from the substrate, and the control circuit controls the switching unit.

Also, the capacitor unit is electrically connected with one of the output terminals. Also, the switching unit includes IGBT (Insulated Gate Bipolar Transistor) devices.

Also, the motor is a running motor used for running of the vehicle, and the controller further includes a running control unit for controlling an operation of the running motor. Instead, the motor is a working motor used for a work by the vehicle, and the controller further includes a working control unit for controlling an operation of the working motor.

In order to achieve another aspect of the present invention, a controller of a vehicle motor includes a first switching unit for controlling power supply to a running motor used running of a vehicle; a first capacitor unit arranged adjacent the first switching unit, and connected with the first switching unit; a first group of output terminals to which the running motor is connected; and a first group of wiring lines or bus bars for connecting the first output terminals and the first switching unit in a straight line route. The controller may further include a second switching unit for controlling power supply to a working motor used for work by the vehicle; a second capacitor unit arranged adjacent the second switching unit and connected with the second switching unit; a second group of output terminals to which the working motor is connected; and a second group of wiring lines or bus bars for connecting the second switching unit and the second output terminals in a straight line route.

DESCRIPTION OF THE PREFERRED EMBODIMENTS

Hereinafter, a controller for a motor of a vehicle of the present invention will be described below in detail with reference to the attached drawings.

Figure 5:
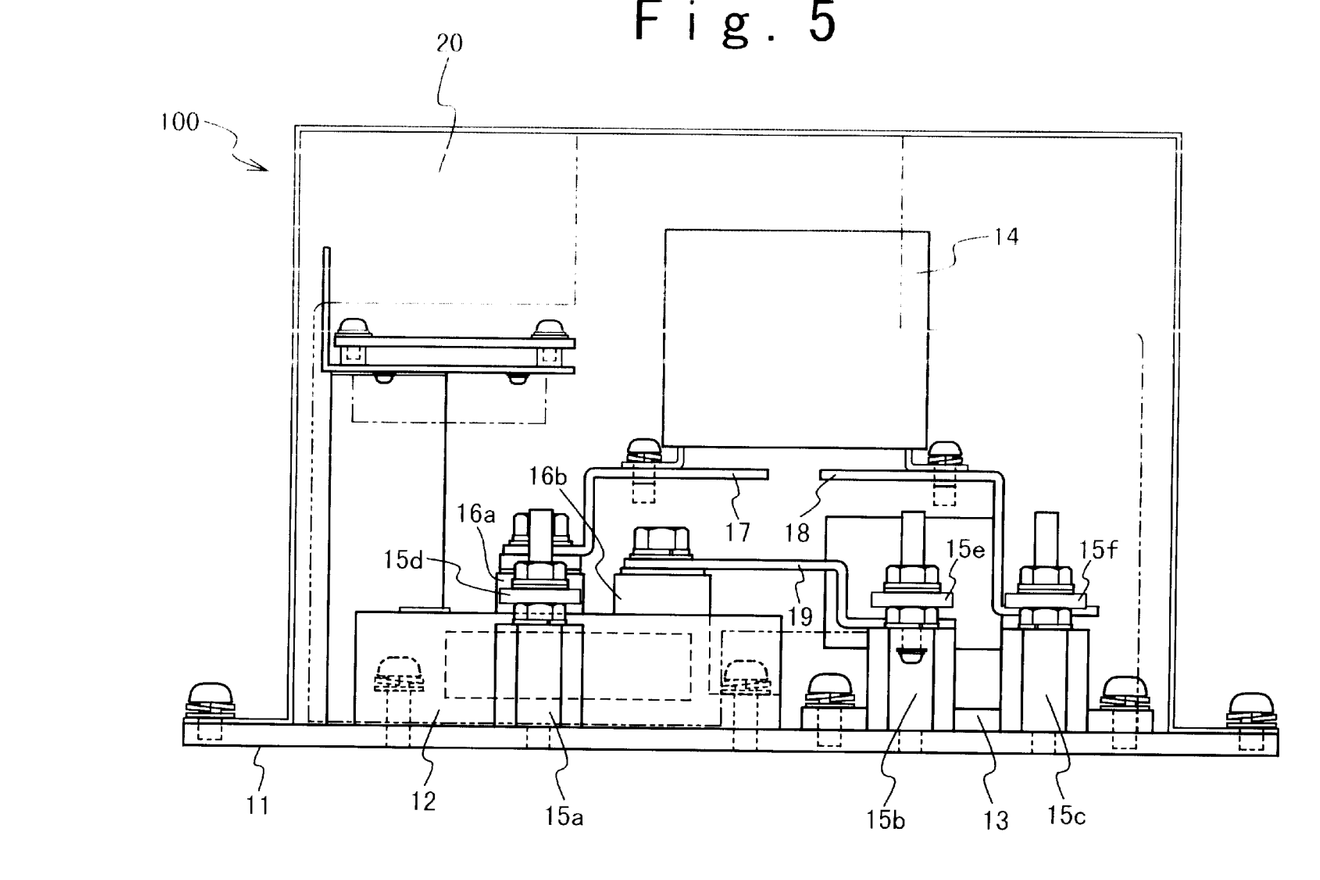
FIG. 5 is a front view of a controller according to an embodiment of the present invention.

FIG. 5 shows a front view of the controller for a motor of a vehicle according to an embodiment of the present invention. Referring to FIG. 5, the controller 100 is composed of a substrate 11, an IGBT device unit 12, a diode unit 13, a capacitor unit 14, the first to third terminals 15a to 15c, the first to third bus bars 15d to 15f, a terminal 16, a first bracket 17, a second bracket 18, a plate 19 and a control unit 20.

The IGBT device unit 12 is provided on the substrate 11 and is composed of IGBT devices 12a and 12b. The diode unit 13 is provided on the substrate 11 and is composed of diodes 13a and 13b. The capacitor unit 14 is composed of capacitors 14a, 14b and 14c. The first to third terminals 15a to 15c are provided on the substrate 11. The first bus bar 15d is connected with the first terminal 15a, the second bus bar 15e is connected with the second terminal 15b, and the third bus bar is connected with the third terminal 15c. The first bracket 17 is connected with one of the terminals of each of the IGBT devices 12a and 12b. Also, the first bracket 17 is connected with one of the terminals of each of the capacitors 14a to 14c. The capacitors 14a to 14c are connected with the second bracket 18 at the other terminal. The second bracket 18 is connected with one of the terminals of each of the diodes 13a and 13b. The other terminals of the respective diodes 13a and 13b are connected with the plate 19. The plate 19 is connected with the other terminals of the IGBT devices 12a and 12b.

For example, the controller 100 is the working controller for controlling a working motor. The first and second terminals 15a and 15b are negative terminals. The third terminal 5c is a positive terminal. The working motor is connected with the second and third terminals 15b and 15c.

Figure 6:
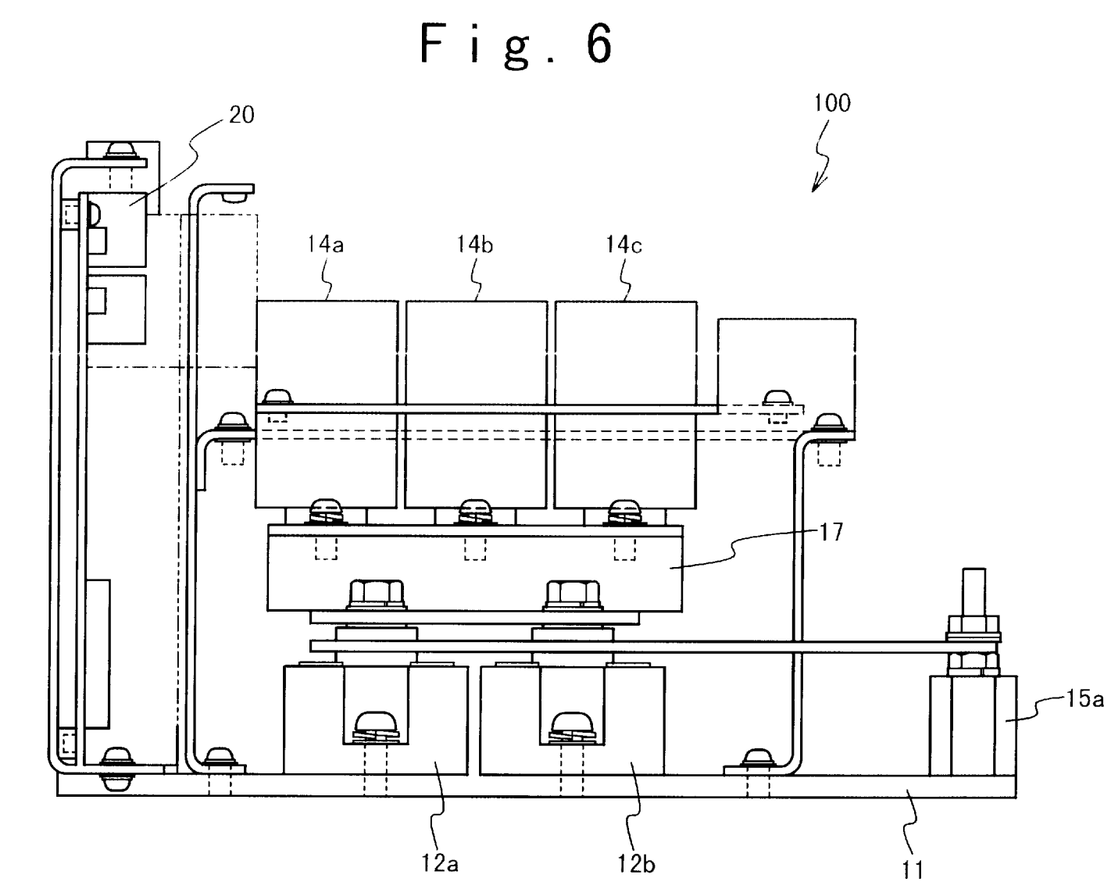
FIG. 6 is a left side view of the controller according to the embodiment of the present invention.

FIG. 6 shows a left side view of the controller according to the embodiment of the present invention. FIG. 6 shows the arrangement of the IGBT unit 12 (the first and second IGBT devices 12a and 12b) and the capacitor unit 14 (first to third capacitors 14a to 14c). The control unit 20 is provided for the substrate 11 of the controller 100. The first and second IGBT device 12a and 12b are provided on the substrate 11 to extend upward. The first to third capacitors 14a to 14c are provided on the first and second IGBT devices 12a and 12b through the first bracket 17. In the figure, the first terminal 15a is shown but the bus bar is omitted.

Figure 7:
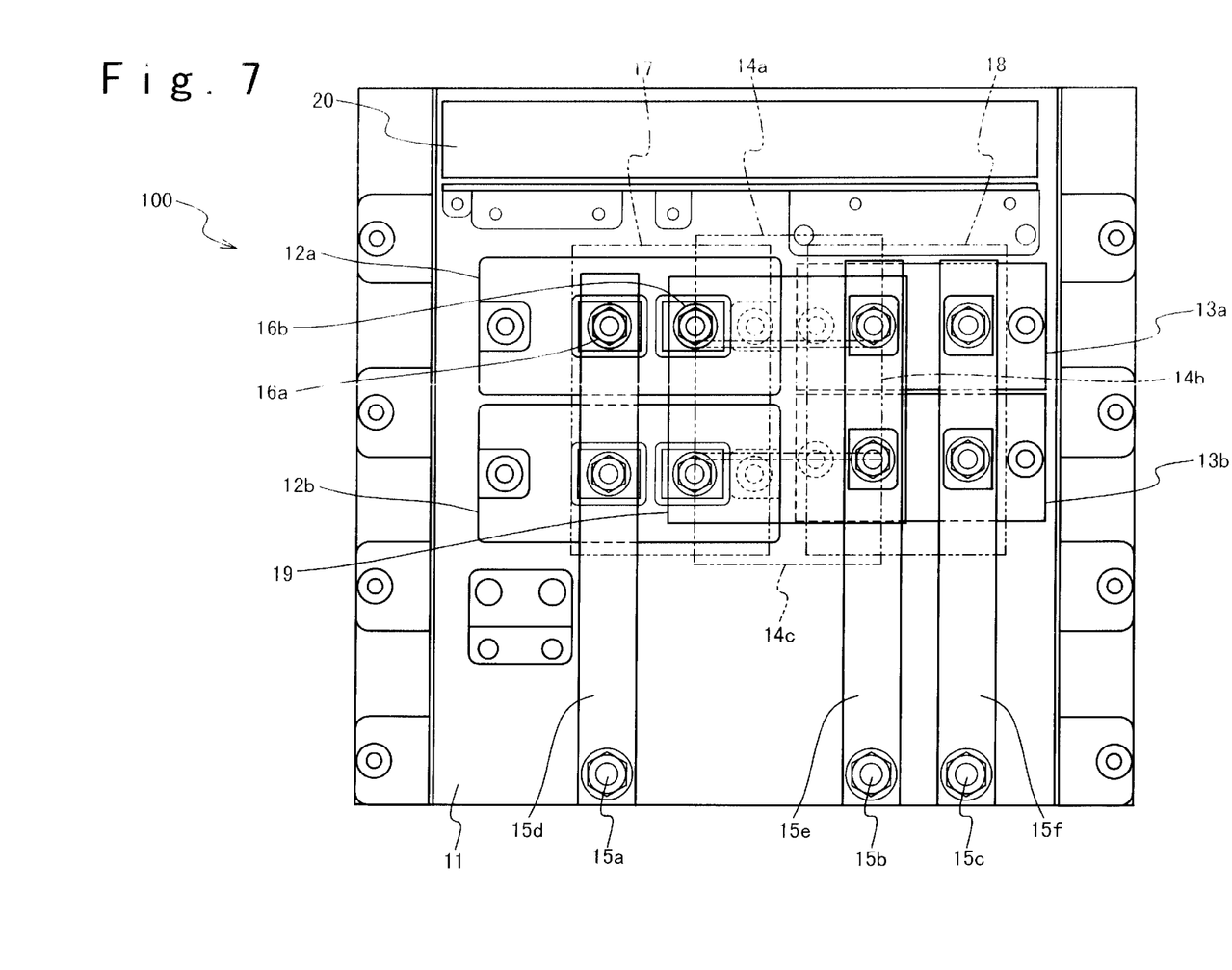
FIG. 7 is a plan view of the controller according to the embodiment of the present invention.

FIG. 7 shows a plan view of the controller 100 according to the embodiment of the present invention. The controller 100 is composed of the substrate 11, the first and second IGBT device 12a and 12b, the first and second diodes 13a to 13b, the first to third capacitors 14a to 14c, the first to third terminals 15a to 15c, the first to third bus bars 15d to 15f and the control unit 20.

The first and second IGBT devices 12a and 12b are provided on the substrate 11. The first and second diodes 13a to 13b are provided on the substrate 11 in alignment with the side of the IGBT unit 12. The first to third terminals 15a to 15c are provided on the substrate 11 via the terminals to extend in a direction orthogonal to the alignment of the IGBT unit 12 and the diode unit 13. The first bus bar 15d is connected with the first terminal 15a. The second bus bar 15e is connected with the second terminal 15b. The third bus bar 15f is connected with the third terminal 15c. The first bus bar 15d and the first bracket 17 (not shown) are connected with the respective ones 16a of terminals of the first and second IGBT devices 12a and 12b. The first bracket 17 is connected with one of the terminals of each of the first to third capacitors 14a to 14c. The other terminal of each of the first to third capacitors 14a to 14c is connected with the second bracket 18. The other terminals of the first to third capacitors 14a to 14c are connected with the second bus bar 15e. The second bus bar 15e is connected with the respective ones of the terminals of the first and second diodes 13a and 13b. The other terminals of the first and second diodes 13a and 13b are connected with the third bus bar 15f.

The first to third bus bars 15d to 15f are connected with the first to third terminals 15a to 15c, the first and second IGBT devices 12a and 12b and the first and second diodes 13a to 13b through a straight line route.

In the structure described above, the capacitor unit 14 is arranged in the neighborhood of the switching unit composed of the first and second IGBT devices 12a and 12b and the first and second diodes 13a and 13b. Therefore, the effect of inductance correction to the switching unit can be sufficiently attained. Also, the wiring line routes of the first to third bus bars 15d to 15f can be set straight to be short. Therefore, the influence of inductance of the bus bars can be reduced. If the inductance correction is sufficiently attained, a surge voltage generated in the first to third terminals 15a to 15c is restrained. If the surge voltage is restrained, it can be avoided that the lifetime of the switching unit becomes short. Moreover, when the surge voltage is restrained, the voltage noise of the first to third terminals 15a to 15c is reduced. Moreover, because the shapes of the first to third bus bars 15d to 15f can be set straight to be short, the cost of the controller 100 can be restrained.

The present invention is not limited to the above embodiment. In the embodiment, the working controller for controlling the working motor is described. If the IGBT unit, the diode unit and the bus bars are increased, and the control unit for controlling the running motor is provided, the running controller for controlling the running motor for the vehicle can be structured. The working controller and the running controller may be connected through detachable interface which carries out a signal transmission with a predetermined protocol. Such a technique is disclosed in U.S. application Ser. No. 09/709,391, in which the inventors are the same as this application, which is entitled "VEHICLE WITH RUNNING MECHANISM AND LIFTING MECHANISM", filed on the same date as this patent application, and claims the priority based on Japanese Patent application No. 2000-029943. The disclosure of the application is incorporated herein by reference.

Also, when a power supply line to the running controller is connected to a power supply line to the working controller, the running control unit and the working control unit can be provided on a single substrate. In this case, the controller is composed of a single control unit, and two sets of capacitor units, a switching unit and a bus bar unit.

In the controller of the motor for the vehicle of the present invention, the capacitor unit is arranged in the neighborhood of the switching element. Also, the bus bar for connecting the switching element and the terminal is formed to have the straight and short shape. Therefore, the inductance correcting operation can be sufficiently carried out and the cost of the bus bar is reduced.

What is claimed is:

1. A controller for a vehicle motor, comprising:
    a switching unit including one or more switching devices mounted on a substrate to control power supplied to a motor;
    a capacitor unit arranged so as to be adjacent said switching unit, and connected to said switching unit;
    output terminals to which said motor is connected;
    elongated generally linear wiring bus bar type lines for connecting said switching unit and said output terminals in a straight line;
    wherein said switching unit further includes a diode unit including one or more diodes respectively mounted in tandem with said switching devices on the substrate; and
    wherein said bus bar type wiring lines extend in a direction orthogonal to the tandem mounting of said switching unit and said diode unit.

2. The controller for the vehicle motor according to claim 1, wherein said capacitor unit is located directly above said switching unit.

3. The controller for the vehicle motor according to claim 2, wherein said capacitor unit is mounted above said switching unit by a pair of angulated brackets.

4. The controller for the vehicle motor according to claim 3, wherein said capacitor unit is attached to said switching unit, and wherein one portion of said angulated brackets is substantially parallel to the bus bar type wiring lines between said switching devices and said diodes.

5. The controller for the vehicle motor according to claim 1, further comprising:
    a control unit, for controlling the switching unit, mounted on an additional substrate which extends upward from said substrate.

6. The controller for the vehicle motor according to claim 1, wherein said capacitor unit is electrically connected to one of said output terminals.

7. The controller of the vehicle motor according to claim 1, wherein said switching devices of said switching unit comprise IGBT (Insulated Gate Bipolar Transistor) devices.

8. The controller of the vehicle motor according to claim 1, wherein said motor comprises a run motor used for providing movement of the vehicle, and
    said controller further includes a control unit for controlling an operation of said run motor.

9. The controller of the vehicle motor according to claim 1, wherein said motor comprises a work motor used for powering a work performing device on the vehicle, and
    said controller further includes a control unit for controlling an operation of the work motor.

10. A vehicle motor controller comprising:
    a first switching unit including a first set of one or more switching devices mounted on a substrate for controlling power supplied to a first motor used for providing movement of a vehicle;
    a first capacitor unit proximally located so as to be adjacent to said first switching unit, and connected with said first switching unit;
    a first group of output terminals to which said first motor is connected;
    a first group of elongated generally linear wiring lines in the form of elongated bus bars for connecting said first output terminals and said first switching unit in a straight line;
    wherein said first switching unit further includes a diode unit including one or more diodes respectively mounted in tandem with said first set of switching devices; and
    wherein said first group of generally linear wiring lines in the form of elongated bus bars extend in a direction orthogonal to the tandem mounting of said switching devices and said diode unit;
    a second switching unit including a second set of one or more switching devices mounted on a substrate for controlling power supply to a second motor used for powering a work performing device on said vehicle;
    a second capacitor unit proximally located so as to be adjacent to said second switching unit and connected with said second switching unit;
    a second group of output terminals to which said second motor is connected;
    second group of elongated generally linear wiring lines in the form of elongated bus bars for connecting second output terminals and said second switching unit in a straight line;
    wherein said second switching unit further includes a diode unit including one or more diodes respectively mounted in tandem with said second set of switching devices; and
    wherein said second group of generally linear wiring lines in the form of elongated bus bars extend in a direction orthogonal to the tandem mounting of said switching devices and said diode unit.

* * * * *